United States Patent
Barba et al.

(10) Patent No.: US 7,191,052 B2
(45) Date of Patent: Mar. 13, 2007

(54) METHOD FOR DETERMINING THE EXHAUST-GAS RECIRCULATION QUANTITY

(75) Inventors: Christian Barba, Fellbach (DE); Martin Dietz, Stuttgart (DE); Guenter Moll, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/519,960

(22) PCT Filed: May 15, 2003

(86) PCT No.: PCT/EP03/05095

§ 371 (c)(1),
(2), (4) Date: Aug. 30, 2005

(87) PCT Pub. No.: WO2004/003364

PCT Pub. Date: Jan. 8, 2004

(65) Prior Publication Data

US 2006/0005819 A1 Jan. 12, 2006

(30) Foreign Application Priority Data

Jun. 29, 2002 (DE) ................ 102 29 620

(51) Int. Cl.
*F02M 25/07* (2006.01)
*F02B 47/08* (2006.01)
*G06F 19/00* (2006.01)
*G01M 15/00* (2006.01)

(52) U.S. Cl. ................. 701/108; 123/568.21; 73/117.3

(58) Field of Classification Search ................ 123/396, 123/399, 403, 568.11, 568.16, 568.21; 701/101–103, 701/108, 115; 73/117.3, 118.1, 118.2; 60/274, 60/285, 286

See application file for complete search history.

(56) References Cited

U.S. PATENT DOCUMENTS 5,619,974 A 4/1997 Rodefeld et al.

(Continued)

FOREIGN PATENT DOCUMENTS

DE 195 02 368 8/1996

(Continued)

OTHER PUBLICATIONS

Patent Abstracts of Japan, vol. 1999, No. 11, Sep. 30, 1999.

*Primary Examiner*—Willis R. Wolfe, Jr.
(74) *Attorney, Agent, or Firm*—Kenyon & Kenyon LLP

(57) ABSTRACT

In a method for determining the exhaust-gas recirculation quantity for an internal combustion engine having exhaust-gas recirculation, a basic quantity of a gas mixture inducted into the engine combustion chamber(s) is determined in advance, as well as a basic pressure and/or a basic temperature of the gas mixture for at least one predefinable basic state of the combustion engine at deactivated exhaust-gas recirculation is ascertained. With the engine running, pressure and/or temperature of the inducted gas mixture are/is then determined for the current engine state at activated exhaust-gas recirculation. The currently inducted gas-mixture quantity as the basic quantity is then corrected by at least the ratio of current pressure to basic pressure of the gas mixture and/or the ratio of basic temperature to current temperature of the gas mixture. Furthermore, a fresh-gas portion of the inducted gas mixture for the current engine state is ascertained, whereupon the current exhaust-gas recirculation quantity is determined on the basis of the difference between the ascertained current gas-mixture quantity and the ascertained fresh-gas portion. The method may used in connection with diesel engines of motor vehicles, for example.

6 Claims, 2 Drawing Sheets

U.S. PATENT DOCUMENTS

| | | |
|---|---|---|
| 5,791,319 A | 8/1998 | Friedrich et al. |
| 6,009,862 A | 1/2000 | Wanat et al. |
| 6,067,800 A | 5/2000 | Kolmanovsky et al. |
| 6,082,325 A * | 7/2000 | Digeser et al. ............. 123/299 |
| 6,115,664 A | 9/2000 | Cullen et al. |
| 6,247,457 B1 | 6/2001 | Mallebrein |
| 6,347,519 B1 | 2/2002 | Kreso |
| 6,688,166 B2 * | 2/2004 | Gerhard et al. ............ 73/118.2 |
| 2003/0182934 A1* | 10/2003 | Adler et al. .................. 60/286 |
| 2005/0193978 A1* | 9/2005 | Ishikawa .................... 123/399 |
| 2006/0161332 A1* | 7/2006 | Barba et al. ................ 701/108 |
| 2006/0167613 A1* | 7/2006 | Barba et al. ................ 701/108 |

FOREIGN PATENT DOCUMENTS

| | | |
|---|---|---|
| DE | 196 03 472 | 8/1997 |
| DE | 199 00 127 | 7/1999 |
| DE | 198 30 300 | 1/2000 |
| DE | 199 34 508 | 2/2000 |
| DE | 199 17 708 | 1/2001 |
| DE | 199 31 223 | 1/2001 |
| DE | 199 61 164 | 6/2001 |
| GB | 2 333 159 | 7/1999 |
| JP | 11-166452 | 6/1999 |

* cited by examiner

METHOD FOR DETERMINING THE EXHAUST-GAS RECIRCULATION QUANTITY

FIELD OF THE INVENTION

The present invention relates to a method for determining the exhaust-gas recirculation quantity for an internal combustion engine having exhaust-gas recirculation.

BACKGROUND INFORMATION

Among others, such engines are used as driving engines of motor vehicles. Exhaust-gas recirculation has advantages with respect to fuel consumption and exhaust emissions. For the purpose of simplification, the term "quantity" is used here as a general term to denote any physical variable indicating a quantity, for the mass or the quantity or mass rate of recirculated exhaust gas, for instance, or the gas mixture inducted into the engine.

The fresh gas quantity inducted into the combustion chamber(s) of the engine is able to be measured, for instance, with the aid of a hot-film air-mass meter (HFM) in an associated intake manifold. The recirculated exhaust-gas quantity, however, cannot be determined in this manner and, without additional measures, it is established at most indirectly, and known only for a very specific configured state such as a standard state of the engine. For other operating states of the engine, and especially given changing temperatures and changing air pressures of the environment from which the fresh gas or the fresh air for the engine is taken, an exhaust-gas recirculation rate other than that of the configured state should be adjusted, for instance, in order to comply fully with the emission limit values. It may therefore be desirable to know the exhaust-gas recirculation rate at all times and as precisely as possible to be able to adjust it to an appropriate value.

In German Published Patent Application No. 199 34 508, a method for controlling the exhaust-gas recirculation is described in which a setpoint exhaust-gas recirculation quantity is detected on the basis of engine load, engine torque and air pressure. An actual exhaust-gas recirculation quantity as well as the opening and closing movements of a throttle valve are detected by sensors. An exhaust-gas recirculation control valve is actuated as a function of the difference between the actual and the setpoint exhaust-gas recirculation quantity and a throttle-valve opening signal as well as a throttle-valve closing signal and the respective associated air pressure. The sensor-based acquisition of the exhaust-gas recirculation quantity is realized by measuring the differential pressure, using a differential pressure sensor at a throttle opening provided in an associated exhaust-gas recirculation conduit.

German Published Patent Application No. 198 30 300 describes determination of the exhaust-gas recirculation quantity as a function of the setting of an exhaust-gas recirculation valve if external exhaust-gas recirculation is involved, and as a function of the dead volume of the combustion chamber and possibly an intake-valve control in the case of internal exhaust-gas recirculation.

In German Published Patent Application No. 199 17 708, a method is described for determining the composition of an air-fuel mixture in the combustion chamber of an internal combustion engine by an ion-current measurement in which a residual gas portion in the air/fuel mixture caused by exhaust-gas recirculation is inferred from a comparison of the amplitudes of a first local maximum and a second local maximum of the ion-current signal characteristic.

SUMMARY

In a method according to an example embodiment of the present invention, the exhaust-gas recirculation quantity may be determined at all times in a precise and reliable manner in different operating states of the engine and, e.g., under varying pressure and temperature conditions of the gas mixture supplied to the engine as well.

In a method according to an example embodiment of the present invention, a basic quantity of a gas mixture inducted into the combustion chamber(s) of the engine is first ascertained in advance for at least one predefinable basic state of the combustion engine at deactivated exhaust-gas recirculation. An advance determination of a basic pressure and/or a basic temperature for the individual basic state is carried out as well. With the engine running, the pressure and/or the temperature of the inducted gas mixture for the particular current engine state at activated exhaust-gas recirculation is determined and the currently inducted gas-mixture quantity then ascertained on that basis. The latter is made up of the predetermined basic quantity of the associated basic state, corrected at least by the ratio of currently determined pressure to basic pressure and/or by the ratio of basic temperature to currently determined temperature. A fresh-gas portion of the inducted gas mixture is ascertained in parallel. The current exhaust-gas recirculation quantity is then determined from the difference between the ascertained currently inducted gas-mixture quantity and the determined current fresh-gas quantity.

Ascertaining the exhaust-gas recirculation quantity according to an example embodiment of the present invention thus may require no sensory system for measuring the recirculated exhaust-gas quantity. Even without a sensory system for the exhaust-gas recirculation quantity, the recirculated exhaust-gas quantity may be determined in a very precise and reliable manner, e.g., by computation on the basis of predetermined basic values for the quantity, the pressure and/or the temperature of the gas mixture in a basic state of the engine and the currently ascertained pressure and temperature values of the gas mixture. The basic values of the particular basic state may be updated from time to time with the engine running, thereby allowing an automatic adaptation of the basic values to changes occurring during the operating life of the engine. It may be provided to predetermine the basic values only for a specific type and not individually for each engine, so that they may then be adapted to the individual engine during its operation.

An example embodiment of the present invention may automatically consider the density loss of the gas mixture resulting for the fresh-gas portion by the admixture of recirculated hot exhaust gas. The mixture temperature may be measured downstream from the admixing location by a temperature sensor having a sufficiently fast response characteristic, or it may be ascertained by computation using a mixture-temperature model, this temperature model being based on a basic exhaust-gas temperature determined in advance in a basic engine state. As an alternative, a suitable sensor may measure the actual and currently prevailing exhaust-gas temperature directly, or the particular current exhaust-gas temperature may be derived from pertinent influence parameters. The cooling rate of the recirculated exhaust gas may be considered until it reaches the admixing location. Toward this end, the temperature of the recirculated exhaust gas immediately in front of the admixing location is measured, alternatively either directly by a suitable sensor, or else the cooling of the recirculated exhaust gas between the point where the aforementioned exhaust-gas temperature is measured or calculated and the admixing location is calculated with the aid of a cooling model as a function of relevant influence parameters.

The mixture-temperature model may be adapted to the instantaneous conditions from time to time, using the measured values from a mixture-temperature sensor downstream from the admixing location, which responds relatively slowly and is thus fairly uncomplicated, such adaptation taking place during suitable, sufficiently steady-state engine-operating states. The mixture temperature model thus may automatically adapt to changes of the engine over the course of its operation.

Exemplary embodiments of the present invention are illustrated in the drawings and explained in the following description.

DETAILED DESCRIPTION

Figure 1:
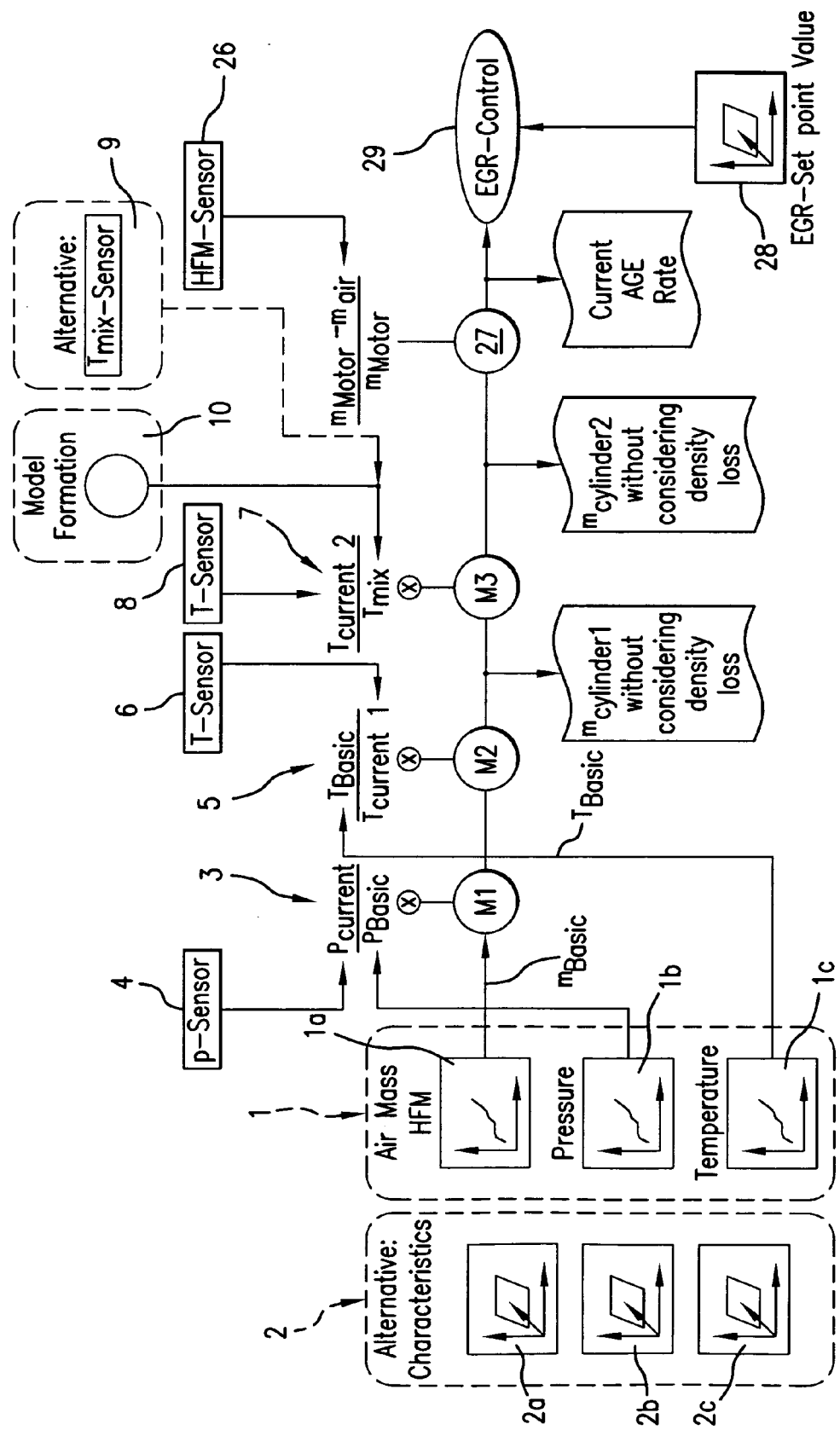
FIG. 1 is a schematic flow chart of a method for determining the exhaust-gas recirculation quantity for an exhaust-gas recirculation quantity control.

The method illustrated in FIG. 1 in a sequence from left to right is used to ascertain the recirculated exhaust-gas quantity or—synonymously—the exhaust-gas recirculation rate or exhaust-gas recirculation mass for a combustion engine having exhaust-gas recirculation, on the basis of a model-based determination of the entire gas-mixture quantity inducted into the engine combustion chamber(s)—also referred to as cylinder mass or intake capacity of the engine—, and a sensor-based detection of its fresh-gas portion, so as to infer the sought recirculated exhaust-gas quantity from the difference. In doing so, the mentioned model-based ascertainment of the entire cylinder mass is implemented either by a model-supported correction of the basic cylinder mass ascertained once in the basic state, and stored, without exhaust-gas recirculation, under basic marginal conditions, e.g., with respect to pressure and temperature, to determine the effect of the influence parameters currently deviating from the basic marginal conditions, e.g., pressure and temperature, or else, as an alternative, it is implemented with the aid of a model-based correction of the basic intake capacity, which is ascertained once and stored in the basic state without exhaust-gas recirculation under basic marginal conditions, in order to determine the effect of the influence parameters currently deviating from the basic marginal conditions. The intake capacity should be understood as the ratio of the actual overall cylinder mass to the theoretical cylinder mass which comes about in a full charge of the cylinder according to the stroke volume, with gas having the requisite density in accordance with the pressure and temperature of the cumulative intake volume, for example. In the former case, the overall cylinder mass is calculated directly, whereas in the latter case it is able to be determined via associated pressure and associated temperature of, for example, the cumulative intake volume from the calculated current intake capacity.

In a first preliminary step, the basic quantity, i.e., the gas-mixture quantity inducted into the engine in this operating state, e.g., the entire cylinder mass, as well as the associated pressure and temperature state of the inducted gas mixture are thus ascertained for this purpose, either for a predefinable basic state of the engine with deactivated exhaust-gas recirculation, or else the intake capacity available in this basic state is determined therefrom, e.g., on an engine test stand prior to installation of the engine at its normal location, e.g., in a motor vehicle. Inasmuch as exhaust-gas recirculation is deactivated, the basic quantity corresponds to the fresh gas quantity inducted in this basic state. This quantity may be detected in a conventional manner, e.g., with the aid of an HFM sensor, in a suitable section of the associated intake path of the engine. For pressure and temperature detection, appropriate conventional pressure and temperature sensors are placed in the cumulative intake volume, for example. In this context, the entire intake path and the position of the sensors for the basic quantity, the basic pressure and the basic temperature should correspond as closely as possible to the configured state of the engine in later use. If the engine includes an exhaust-gas turbocharger, the sensors are placed downstream from it. If the engines have additional charge-air cooling, the sensors are placed downstream from the charge-air cooler.

The basic data obtained in advance in this manner are then stored in an engine control unit as characteristic curves 1, i.e., a basic quantity characteristic curve 1a indicating the fresh gas quantity inducted in the particular selected basic state as a function of the engine operating point, a basic pressure characteristic curve 1b as a function of the operating point, and a basic temperature characteristic curve 1c as a function of the operating point are available in the engine control unit. As an alternative, instead of storing the basic values ascertained in advance as basic characteristic curves, it is possible as illustrated in FIG. 1, to store them in the engine control unit as basic characteristic maps 2 as a function of the engine operating point, i.e., in the form of a basic quantity characteristics map 2a, a basic pressure characteristics map 2b, and a basic temperature characteristics map 2c.

As a result, characteristic curve group 1 or characteristic curve group 2 includes information about the basic intake capacity of the examined engine together with related information regarding pressure and temperature of the fresh gas—which is fresh air in most cases—supplied into the engine at deactivated exhaust-gas recirculation. Furthermore, instead of these basic quantities, basic pressures and basic temperatures, a direct storage of characteristic curves or characteristics maps of the basic intake capacity is possible as well.

The basic values stored in the engine control unit in this manner prior to the actual engine operation may be adapted to the current situation from time to time during later operation of the engine such as during use in the motor vehicle. For example, the basic values for a specific engine type may be recorded in only one or a few engine samples and then stored for all engines of this type in the control unit from where they are able to be adapted to the individual engine during engine operation.

The adaptation takes place in appropriate operating states of the engine that correspond to the selected basic state(s), e.g., operating states without activated exhaust-gas recirculation. For the adaptation, the current values for quantity, pressure and temperature of the fresh air inducted into the engine are ascertained by sensors at an associated reference measuring location during the corresponding operating states or in some other manner, e.g., via suitable computation models, whereupon the stored basic values are compared to these currently ascertained values and updated or adapted in an appropriate manner, if required. In the event that the intake capacity instead of the overall cylinder mass is stored in the basic values, the intake capacity may first be ascertained from the instantaneous quantity values, i.e., overall cylinder mass, pressure and temperature at the associated reference measuring location, so that the corresponding basic value may then be updated or adapted on this basis.

This adaptation process not only makes it possible to compensate for fluctuations in the basic values between individual engines, but also may achieve an adaptation of these basic values to its current usage state for each individual engine over the course of its service life. For example, if a particle filter of a diesel engine is gradually becoming clogged, such an adaptation automatically reduces the basic quantity of the inducted gas mixture to a corresponding degree. In a similar manner, an intake capacity that changes over time, perhaps due to air supply organs becoming clogged or due to changing valve-control times, is detected by the adaptation and trained accordingly. During normal use of the engine, the particular engine-individual basic state, which is represented by characteristic curve group 1 or characteristics map group 2 and is independent of the service life, will then be assumed and the current cylinder mass in each case ascertained, either arithmetically using the ideal gas equation, whereby the basic quantity is corrected appropriately as a function of the current pressure and the current temperature of the instantaneously inducted gas mixture compared to the basic pressure and the basic temperature at the associated reference measuring location, or else the current cylinder mass is ascertained arithmetically from the basic intake capacity on the basis of the current pressure and current temperature at the associated reference measuring point.

In the first case a corresponding correction follows from the ideal gas equation. To be more specific, it follows from the ideal gas equation that the current gas mixture quantity results from the basic quantity, multiplied by the ratio of current pressure to basic pressure and the ratio of basic temperature to current temperature, i.e., the following equation applies $$m_{current} = m_{Basic} \cdot (p_{current}/p_{basic}) \cdot (T_{basic}/T_{current})$$

with current gas mixture quantity $m_{current}$, basic quantity $m_{basic}$, current pressure $p_{current}$, basic pressure $p_{basic}$, current temperature $T_{current}$ and basic temperature $T_{basic}$. Accordingly, as illustrated in FIG. 1, current pressure $P_{current}$ is measured by a pressure sensor 4 in a pressure-correction step 3 and divided by the associated, stored basic pressure $p_{basic}$. In a first multiplication step M1, stored associated basic quantity $m_{basic}$ is multiplied by this pressure ratio.

In a subsequent, two-step temperature correction step, basic temperature value $T_{basic}$ associated with the selected basic state, in a first partial step 5, is initially divided by a first current fresh gas temperature value $T_{current1}$, which is detected by an associated fresh gas temperature sensor 6. As in the case of basic temperature value $T_{basic}$, this temperature value $T_{current1}$ is a temperature value obtained at a relatively heavy delay, as it is provided, for example, by a relatively slow-responding temperature sensor. The pressure-corrected basic quantity is then multiplied by this temperature ratio in a second multiplication step M2.

Cylinder-mass value $m_{cylinder}$ ascertained up to this stage so far does not consider the temperature-related density loss resulting for the fresh-gas portion by the admixing of recirculated exhaust gas which is hotter than the fresh gas. A second temperature-correction step 7 therefore takes this density loss into account. To this end, the quotient of a current temperature value $t_{current2}$ and a mixture-temperature value $T_{mix}$, whose determination will be explained in more detail in the following, is formed, by which gas-mixture quantity value $m_{cylinder1}$, which so far does not consider the density loss, is multiplied in a third multiplication step M3, so as to result in the corresponding quantity value $m_{cylinder2}$ which takes the density loss into account. Second current temperature value $T_{current2}$ is a temperature value which has less delay than first temperature value $T_{current1}$ and is obtained by an associated additional fresh gas temperature sensor 8. As an alternative, the two current temperature values $T_{current1}$, $T_{current2}$ may be obtained by correspondingly different processing of the signal from an individual temperature sensor responding with sufficient speed.

Cylinder-mass value $m_{cylinder2}$ derived from basic quantity $M_{basic}$ in this manner on the basis of the various correction contributions then represents the ascertained currently inducted gas-mixture quantity $m_{Engine}$, from which a fresh-gas portion $m_{air}$ ascertained by an HFM sensor 26 is deducted in a final exhaust-gas quantity recirculation ascertainment step 27 so as to obtain the current exhaust-gas recirculation quantity sought. To the same effect, the current exhaust-gas recirculation rate is ascertained according to FIG. 1 as the ratio of the difference from overall quantity $m_{Engine}$ and fresh-gas portion $m_{Air}$ to overall quantity $m_{Engine}$. This actual value and also an exhaust-gas recirculation rate setpoint value ascertained with the aid of an associated characteristics map 28 is supplied to a conventional EGR control 29, which regulates the exhaust-gas recirculation rate or the exhaust-gas recirculation quantity correspondingly.

Mixture temperature $T_{mix}$ may be determined by sensors with the aid of an associated temperature sensor 9 having a sufficiently rapid response characteristic, such sensor being placed downstream from the admixing location of the recirculated exhaust gas to the fresh air. In some cases, for example, in diesel engines, the problem may occur that a temperature sensor placed there may need to be protected from the action of the exhaust gas, which slows the response behavior. In such specific cases as well, mixture temperature $T_{mix}$ may alternatively be determined arithmetically on the basis of a mixture-temperature model 10, which is shown in greater detail in FIG. 2.

Figure 2:
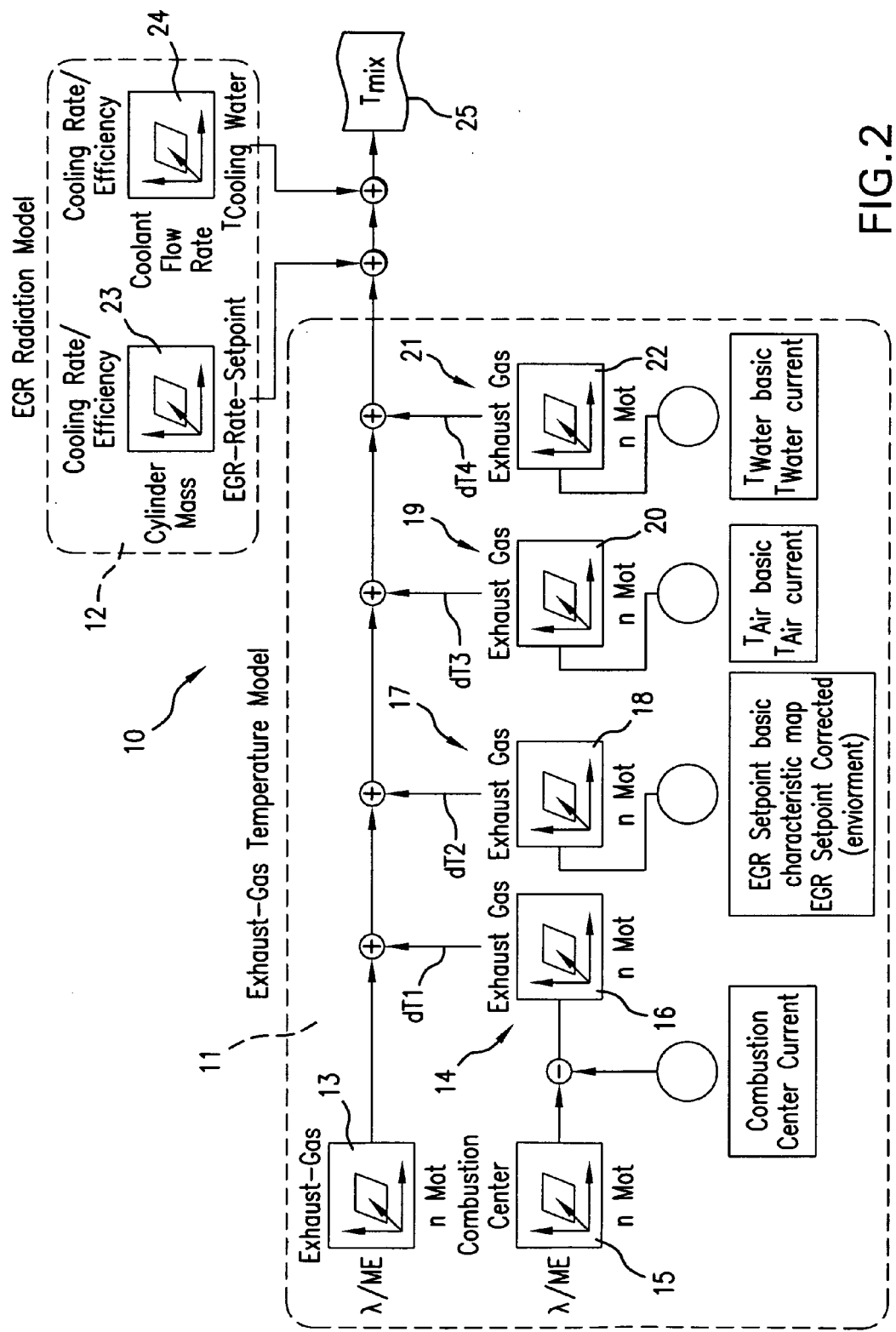
FIG. 2 is a schematic flow chart for determining a mixture temperature on the basis of a mixture-temperature model, optionally used in the method illustrated in FIG. 1.

As illustrated in FIG. 2, the mixture-temperature model is made up of an exhaust-gas temperature model 11 and an exhaust-gas recirculation cooling model 12. Exhaust-gas temperature model 11 includes the advance detection of a basic exhaust-gas temperature characteristics map 13, which describes a basic exhaust-gas temperature for a predefinable basic or standard state as a function of the engine operating point, represented by the explicitly given variables engine speed nMot and lambda value λ/ME, at deactivated exhaust-gas recirculation, and which is stored in the engine control unit. During normal use of the engine the most important influence parameters for the exhaust-gas temperature are continuously detected, and the current exhaust-gas temperature is estimated by updating the basic exhaust-gas temperature by correction values based on a characteristics map and which result from an individual comparison of a currently ascertained influence-parameter value with the influence-parameter value associated with the stored basic state.

In exhaust-gas temperature model 11 of FIG. 2, the relative position of the injection, i.e., the center of combustion, the exhaust-gas recirculation rate, the ambient-air temperature and the engine cooling-water temperature may be chosen as specific influence parameters. Depending on the application case, it is possible to include only a portion of these influence parameters and/or additional influence parameters in exhaust-gas temperature model 11.

Within the framework of exhaust-gas temperature model 11 of FIG. 2, an instantaneous center of combustion is continuously determined in a combustion-center correction step 14 during operation of the engine and subtracted from a basic combustion center, which is taken from a stored associated characteristics map 15, which includes values of the center of combustion determined in advance for the particular basic state as a function of the engine operating point. From a corresponding additionally stored characteristics map 16, the ascertained combustion-center difference is assigned an associated first exhaust-gas temperature correction value dT1 by which the basic exhaust-gas temperature value associated with the particular engine state is corrected in an additive manner.

In an exhaust-gas recirculation rate correction step 17, the difference between an exhaust-gas recirculation rate setpoint value as it results from an associated stored basic characteristics map, and a setpoint value possibly corrected under emission or environmental aspects is formed and, on the basis of an associated characteristics map 18, a second exhaust-gas temperature correction value dT2 is assigned to this difference, which represents an additive correction contribution to the basic exhaust-gas temperature.

In an air-temperature correction step 19, the instantaneously detected ambient air temperature is subtracted from a predefined basic air temperature and a corresponding third exhaust-gas temperature correction value dT3 is assigned to this difference with the aid of an associated stored characteristics map 20 as a function of the engine-operating point, the basic exhaust-gas temperature once again being additively corrected by this third exhaust-gas temperature correction value dT3.

In an engine-cooling water correction step 21, the difference between a predefined basic engine-cooling water temperature and the currently recorded engine-cooling water temperature is formed, and a fourth exhaust-gas temperature correction value dT4 is assigned to this difference on the basis of an associated stored characteristics map 22 as a function of the engine-operating point, this fourth correction value dT4 constituting a further additive correction contribution for deriving the current exhaust-gas temperature from the basic exhaust-gas temperature.

In this manner and on the basis of a predefinable basic state, it is possible to estimate the exhaust-gas temperature for any other operating states of the engine with the aid of exhaust-gas temperature model 11. The exhaust-gas temperature value thus obtained may take the cooling rate of the recirculated exhaust gas on its way from the engine to the admixing location into account. For an engine having an exhaust-gas recirculation (EGR) radiator, in the example of FIG. 2 this is implemented by EGR cooling model 12. An exhaust-gas flow-rate characteristics map 23 and a coolant characteristics map 24 are entered in this cooling model 12. Exhaust-gas flow rate characteristics map 23 indicates the cooling rate or the efficiency of the EGR radiator as a function of the exhaust-gas flow rate through the EGR radiator, this exhaust-gas flow rate being estimated on the basis of a setpoint exhaust-gas recirculation rate and the overall cylinder mass. Coolant characteristics map 24 indicates the influence of the coolant on the cooling rate or the efficiency, e.g., as a function of the temperature and flow rate of the coolant or cooling water. Both characteristics maps 23, 24 provides another additive correction contribution in each case for determining the current temperature of the recirculated exhaust gas.

Depending on the application case, an individual correction contribution may be entered in the model-based estimation of the exhaust-gas temperature not only in an additive manner, but also in some other fashion, for example, in a multiplicative manner, and that it is possible as an alternative to use corresponding stored characteristic curves instead of the mentioned characteristics maps.

In a final mixture-temperature determination step 25, the sought mixture temperature $T_{mix}$ is then determined on the basis of the temperature, ascertained on the basis of the model, of the recirculated exhaust gas in front of the admixing location, this temperature corresponding, for example, to that of the recirculated exhaust gas in front of an EGR valve in an EGR conduit, and on the basis of the temperature of the supplied fresh gas in front of the admixing location.

As an option, an adaptation of entire mixture-temperature model 10 over the engine operating time may be provided so as to adapt the model to any modifications of the engine system. A mixture-temperature sensor similar to mentioned sensor 9 downstream from the admixing location may be used for this purpose, for which a relatively slow response characteristic may suffice, however. It is then used to sense the mixture temperature in sufficiently steady-state operating states of the engine, and mixture-temperature model 10 is adjusted by the mixture-temperature measured value thus obtained.

As the above description of the illustrated exemplary embodiment and variants thereof makes clear, a comparatively exact determination of the current exhaust-gas recirculation rate may be provided practically across the entire operating range of the engine without complicated constructive and sensory additional measures, so that a conventional engine sensory system framework and a conventional structure of an exhaust-gas recirculation system may be sufficient. With activated exhaust-gas recirculation, this may permit low-emission engine operation practically in the entire range of the engine characteristics map. The method according to an example embodiment of the present invention may be suited for combustion engines having self-ignition and, e.g., for engines having a common-rail fuel injection device. When used in motor vehicles, a precise control or regulation of the exhaust-gas recirculation may also be maintained when driving at different altitudes and at different outer temperatures. Since relatively precise knowledge of the exhaust-gas recirculation rate may be provided in a relatively precise manner, additional engine functionalities, such as full-load limiting, smoke characteristics maps, protective engine functions and exhaust-gas turbocharger control may be improved.

What is claimed is:

1. A method for determining exhaust-gas recirculation quantity for a combustion engine having exhaust-gas recirculation, comprising:
    (a) advance determining of a basic quantity of a gas mixture inducted into at least one combustion chamber of the combustion engine and at least one of (a) a basic pressure and (b) a basic temperature of the gas mixture for at least one predefinable basic state of the combustion engine at deactivated exhaust-gas recirculation;
    (b) ascertaining at least one of (a) a pressure and (b) a temperature of the inducted gas mixture for a particular current engine state at activated exhaust-gas recirculation;

(c) determining a currently inducted gas-mixture quantity as the basic quantity, corrected at least by at least one of (a) a ratio of currently ascertained pressure to basic pressure of the gas mixture and (b) a ratio of the basic temperature to currently ascertained temperature of the gas mixture;

(d) determining a fresh-gas portion of the inducted gas mixture for the particular current engine state, and (e) determining a current exhaust-gas recirculation quantity in accordance with a difference between the currently inducted gas-mixture quantity determining in the determining step (c) and the current fresh-gas portion determined in the determining step (d).

2. The method according to claim 1, further comprising updating predetermined basic data with the combustion engine running when suitable, predefinable engine-operating states are present in accordance with ascertained current quantity, pressure and temperature values of the inducted gas mixture.

3. The method according to claim 1, wherein the ascertaining step (b) includes determining a mixing temperature that results from admixing of recirculated exhaust gas to the fresh-gas portion of the inducted gas mixture.

4. The method according to claim 3, wherein the determination of the mixing temperature is performed by one of (a) a temperature sensor having a sufficiently fast response characteristic and arranged placed downstream from an admixing location of recirculated exhaust gas to the fresh-gas portion and (b) a mixture-temperature model that includes a model-based determination of the exhaust-gas temperature in accordance with basic exhaust-gas temperature values, ascertained in advance for a basic state, and of temperature-correction contributions obtained from a current detection of influence parameters relevant for the exhaust-gas temperature.

5. The method according to claim 4, further comprising correcting the exhaust-gas temperature value determined by an exhaust-gas temperature model by an exhaust-as recirculation cooling-rate contribution to determine the temperature of the recirculated exhaust gas.

6. The method according to claim 3, further comprising updating a mixture-temperature model while the combustion engine is running during sufficiently steady-state engine operating states based on measured values from a temperature sensor arranged downstream from the admixing location of the recirculated exhaust gas to the fresh-gas portion.

* * * * *